O. W. THOMPSON.
GAGE.
APPLICATION FILED MAY 3, 1915.

1,339,989.

Patented May 11, 1920.
2 SHEETS—SHEET 1.

Witnesses:
Robert H. Weir

Inventor:
Orville W. Thompson
By Hiee & Hiee
Attys.

O. W. THOMPSON.
GAGE.
APPLICATION FILED MAY 3, 1915.
1,339,989.
Patented May 11, 1920.
2 SHEETS—SHEET 2.
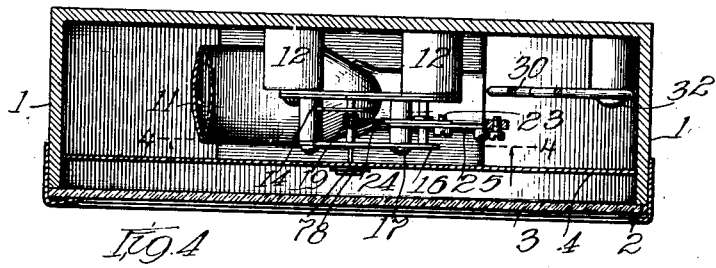
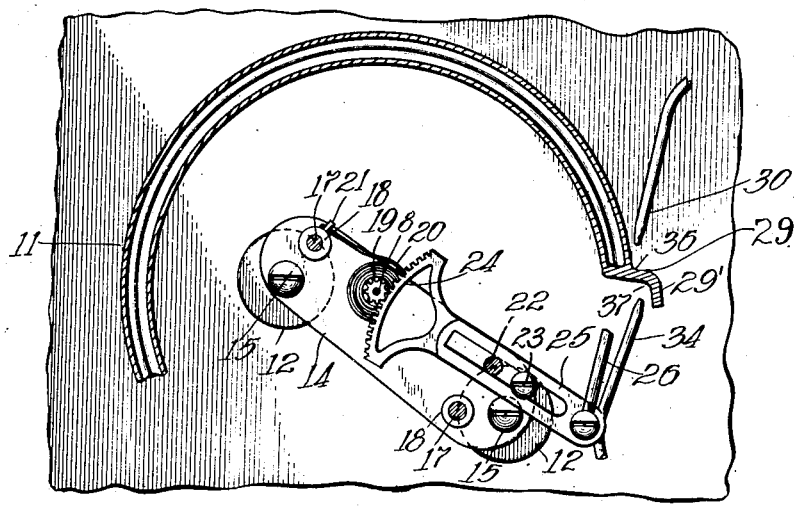
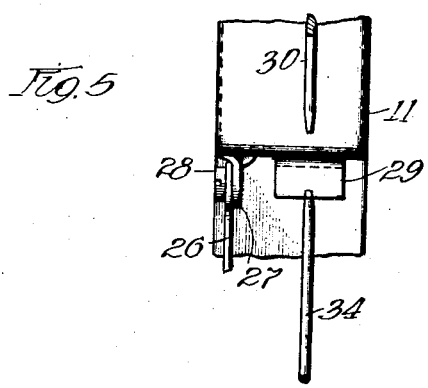
Witnesses:
Robert F. Weir
Herbert G. Kalm
Inventor
Orville W. Thompson
By Hill & Hill
attys

UNITED STATES PATENT OFFICE.

ORVILLE W. THOMPSON, OF CHICAGO, ILLINOIS.

GAGE.

1,339,989.   Specification of Letters Patent.   Patented May 11, 1920.

Application filed May 3, 1915. Serial No. 25,530.

*To all whom it may concern:*

Be it known that I, ORVILLE W. THOMPSON, a citizen of the United States, residing at Chicago, in the county of Cook and State of Illinois, have invented certain new and useful Improvements in Gages, of which the following is a description.

My invention belongs to that general class of devices known as gages, and particularly a gage suitable for low readings, as for example, on a low pressure system. The invention has among its objects the production of a device of the kind described that is simple, convenient, durable, efficient and satisfactory, for use wherever found applicable. I have particularly shown my invention as applied to a gage, arranged for indicating vacuum in inches, as well as pressure in pounds, in the system in which the gage is used. In the improved construction shown, the gage is also designed to accurately show slight variations in pressure up to a certain point, and wider variations at higher pressures. Similarly, it is designed to indicate a vacuum in the system in inches for a portion of the gradations, in small variations, and after a certain point to show a wider range.

In the form of device shown, pressure is indicated, as for example, in ounces up to five pounds, the gage being suitable for a low pressure system, and then to record 15 and 30 pounds, as a maximum and intermediate pressure, other intermediate pressures being estimated. A similar arrangement is provided on the vacuum side of the dial, to show the vacuum in inches.

The invention has particularly among its objects, and as a part of those previously enumerated, the production of a gage in which normally there is no abnormal strain on the Bourdon spring or indicator actuating mechanism. The Bourdon spring under the normal conditions for which it is designed is entirely free to operate, but after predetermined movement, further action of the same is retarded, so that higher pressure or greater vacuum may be indicated with a less travel of the indicator. Normally the Bourdon spring acts in the usual manner, and true to the usual designing formula, and being free, does not tend to set or register inaccurately. After predetermined movement of the indicator, however, the Bourdon spring is supplemented, or that is, in the construction shown its movement is retarded or opposed so that the further travel of the indicator is not as great. Other advantages and objects will appear to those skilled in the art from the disclosure herein given.

To this end my invention consists in the novel construction, arrangement and combination of parts herein shown and described, and more particularly pointed out in the claims.

In the drawings, wherein like reference characters indicate like or corresponding parts, Figure 1 is a full view of one form of my gage;

Fig. 3 is a sectional view taken substantially on line 3, 3 of Fig. 2;

Fig. 4 is an enlarged sectional view taken substantially on line 4, 4 of Fig. 3, and Fig. 5 is an enlarged sectional view taken substantially on line 5, 5 of Fig. 2.

Figure 1:
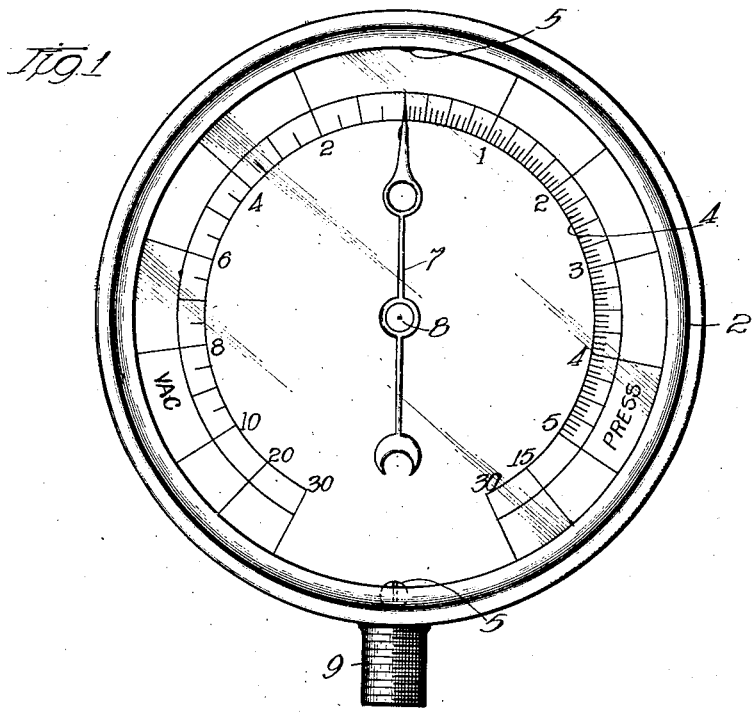

Referring to the drawings, 1 represents a suitable casing, over which may be arranged a glass face 3, retained in place by the flanged ring 2, or equivalent means. Within the casing is arranged a dial 4, the same being supported on the projection 6, and secured in place by screws 5, or their equivalents, in the usual manner. The dial shown is arranged to indicate both pressure and vacuum, pressure up to five pounds in ounces, and vacuum up to ten inches in inches. The particular indication, however, is immaterial, as this may vary, as desired, depending on the use for which the gage is designed. Arranged to coöperate with the dial is an indicator or pointer 7, mounted upon the spindle 8.

Arranged within the casing below the dial is the well known type of Bourdon spring, constructed of suitable material and according to the proper design or formula to give the results desired. This is connected to the connection 10, in communication with the pipe or nipple 9, by means of which the gage is connected in the system. Arranged within the casing are suitable posts or lugs 12, or their equivalents, which carry the frame parts, consisting of the plates 14, secured to the lugs by screws 15, or their equivalents, and the plate 16 supported by the screws 17, and spaced by the sleeves 18. The spindle 8 is carried by the plates 14 and 16, and projects through the dial. Arranged on the spindle 8 is a small pinion 19, arranged to mesh with a gear segment 24. A small coiled spring 20, secured at 21, to posts 17, or to the spindle 8, normally steadies the spindle in the usual manner, and tends to return the indicator spindle to normal position. The segment 24 is pivotally carried by a post or pin 22, and is provided with an adjustable arm 25, secured thereto by screw 23, or the equivalent, suitably connected by a link 26 to the Bourdon spring. I have shown the link 26 pivotally secured by a screw 28 to the extension 27 on the Bourdon spring. So far the construction of the device as described is well known and common in gages, with the exception, perhaps, that the teeth of the pinion and gear segment are made smaller and greater in number, and the parts so assembled that very slight movement of the Bourdon spring, due to pressure or vacuum in the system, will positively and accurately move the indicator. There being no pin for the indicator to stop against, there is consequently no strain on any part when the indicator reads zero. While the particular gage illustrated is designed for use on what are known as low pressure systems, wherein the pressure may not exceed five pounds, it is desirable to have the gage constructed so as to indicate higher pressures for the sake of safety, and also in many cases to comply with municipal ordinances and regulations and the like.

Figure 2:
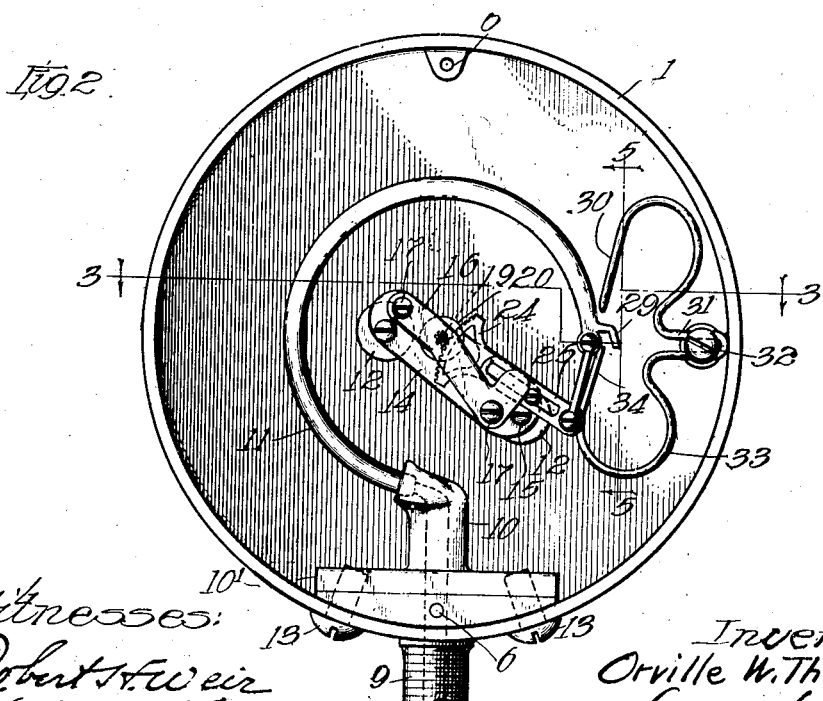
Fig. 2 is a plan view of the same, the dial and glass face removed.

As most clearly shown in Figs. 2, 4 and 5, I preferably provide an offset 29, or the equivalent, on the Bourdon spring, as shown at the end, said offset terminating in a downwardly extending shoulder 29' and provide an auxiliary spring, or yieldable member 30, which in the form shown is formed with a shank 31 secured in place by the screw 32, or equivalent fastening means. The particular gage shown being adapted to register vacuum, as well as pressure, is also provided with a similarly formed spring 34, the same being looped at 33, or as shown, the part 31, extended as shown. Where, of course, the gage only records either pressure or vacuum alone, the double spring would not be necessary. It will be particularly noted that normally, or when the indicating is at zero, the Bourdon spring is entirely free to act without in any way being retarded or opposed by the action of the spring 30 or 34. In the gage illustrated, the parts are preferably so arranged that the offset 29 will not engage with 30 until the indicator has reached five pounds, or not engage with the retarder 34 until the indicator has reached a point to indicate ten inches vacuum. As soon, however, as this pressure or vacuum is indicated, 29 engages with the coöperating retarding member, and the retarding member supplements the Bourdon spring, so that if there is a greater increase in the pressure, or inches of vacuum, the movement of the indicator need not be so great or extensive as to indicate higher values or readings, so that the dial scale may be reduced in size. Referring particularly to Fig. 4, it may be mentioned that retarding spring 30 engages substantially in the corner 36 and retarding spring 34 in the corner 37. By so engaging there is no tendency for the extension 29 to slide on the retarding springs. As a result all pressure on the Bourdon spring is equalized throughout the spring without any pressure at any one point.

In this construction there is no strain on the Bourdon spring whatever for pressure or vacuum in inches, within the limits for which the gage would ordinarily be called on to indicate, nor is there any great tendency for the spring to set. This permits a gage to be designed, which for a certain range of readings or indications, may be made extremely delicate, and accurately indicate the small gradations or variations. It is, of course, understood that while the gage is adapted for low pressure, and is suitable to indicate vacuum, as well as pressure, the parts may be so proportioned as to give various higher readings in substantially an equivalent manner, these being dependent upon the divisions indicated on the dial, and strength and size of the Bourdon spring.

Having thus described my invention, it is obvious that various immaterial modifications may be made in the same without departing from the spirit of my invention; hence I do not wish to be understood as limiting myself to the exact form, construction, arrangement or combination of parts herein shown and described, or uses mentioned.

What I claim as new and desire to secure by Letters Patent is:—

1. In a gage, a dial, an indicator arranged to coöperate therewith, a Bourdon spring operatively connected with said indicator, said spring provided with an offset at one end thereof, said offset formed with a downwardly extending shoulder at the end thereof, in combination with a detachable spring member having two branches normally disconnected from said Bourdon spring, one of said branches arranged to engage the Bourdon spring at substantially the junction of the offset therewith after a predetermined movement of the Bourdon spring in one direction from its neutral position, and the other of said branches to engage the shoulder at its junction with the offset at a predetermined movement of the spring in the other direction from such position.

2. A gage comprising a dial and a pointer movable thereover, controlling and actuating means for the pointer including a Bourdon spring, means for operatively connecting the pointer with the Bourdon spring, in combination with a resilient member bent to have oppositely disposed portions, the ends of which are separated from each other and normally disconnected from the Bourdon spring, one of said oppositely disposed portions adapted to coöperate with said spring after a predetermined movement of the Bourdon spring in an outward direction from its neutral position, and the other of said oppositely disposed portions adapted to coöperate with said spring after a predetermined movement of the same in an inward direction from its neutral position.

3. In a gage, a pressure responsive operating mechanism to indicate pressure or vacuum, and means for retarding the movements of the pressure responsive mechanism after a predetermined free movement of the latter in either direction from its neutral position.

In testimony whereof I have hereunto signed my name in the presence of two subscribing witnesses.

ORVILLE W. THOMPSON.

Witnesses:
 Roy W. Hill,
 Charles I. Cobb.